United States Patent [19]

Griffin

[11] Patent Number: 5,060,739
[45] Date of Patent: Oct. 29, 1991

[54] CUTTER ASSEMBLIES FOR ROTARY DRILL BITS, AND METHOD OF MANUFACTURING SAME

[76] Inventor: Nigel D. Griffin, 15 Paynes Meadow, Whitminster, Gloucestershire, England

[21] Appl. No.: 470,916

[22] Filed: Jan. 26, 1990

[30] Foreign Application Priority Data

Jan. 26, 1989 [GB] United Kingdom ................ 8901729

[51] Int. Cl.$^5$ ...................... B23K 31/02; E21B 10/46
[52] U.S. Cl. ................................... 175/329; 175/411; 228/125; 228/168; 407/118
[58] Field of Search .................... 175/329, 410, 411; 407/118; 76/108.2; 228/121, 124, 125, 164, 165, 168; 51/281 R, 289 R

[56] References Cited

U.S. PATENT DOCUMENTS

| | | | |
|---|---|---|---|
| 2,753,622 | 7/1956 | Bieber et al. | 228/125 |
| 4,520,881 | 6/1985 | Phaal | 175/329 |
| 4,716,975 | 1/1988 | Dennis | 175/410 X |
| 4,727,945 | 3/1988 | Dennis | 175/329 |
| 4,767,050 | 8/1988 | Flood et al. | 228/122 |
| 4,893,875 | 1/1990 | Lonn et al. | 175/411 |
| 4,972,912 | 11/1990 | Keshavan | 175/410 X |
| 4,993,505 | 2/1991 | Packer et al. | 175/411 X |

FOREIGN PATENT DOCUMENTS

| | | |
|---|---|---|
| 185537 | 6/1986 | European Pat. Off. . |
| 263660 | 4/1988 | European Pat. Off. ............. 175/410 |

*Primary Examiner*—David J. Bagnell
*Attorney, Agent, or Firm*—Browning, Bushman Anderson & Bookhart

[57] ABSTRACT

A cutter assembly, for a rotary drill bit, comprises a stud to be received in a socket in the surface of the bit body, the stud being formed, adjacent one end, with a plane surface inclined to the longitudinal axis of the stud. A preform cutting element comprises a front surface, a peripheral edge surface, and a flat rear surface which is brazed to the surface on the stud, the peripheral edge surface of the cutting element being wholly exposed. The junction between the peripheral edge surface and the rear surface of the cutting element is chamfered. Any external fillet of brazing alloy is preferably removed or is not allowed to form during brazing, and the space between the chamfer and the surface of the stud may also be free of brazing alloy. Removal of the brazing fillet may also be advantageous in the case of a non-chamfered cutter.

15 Claims, 3 Drawing Sheets

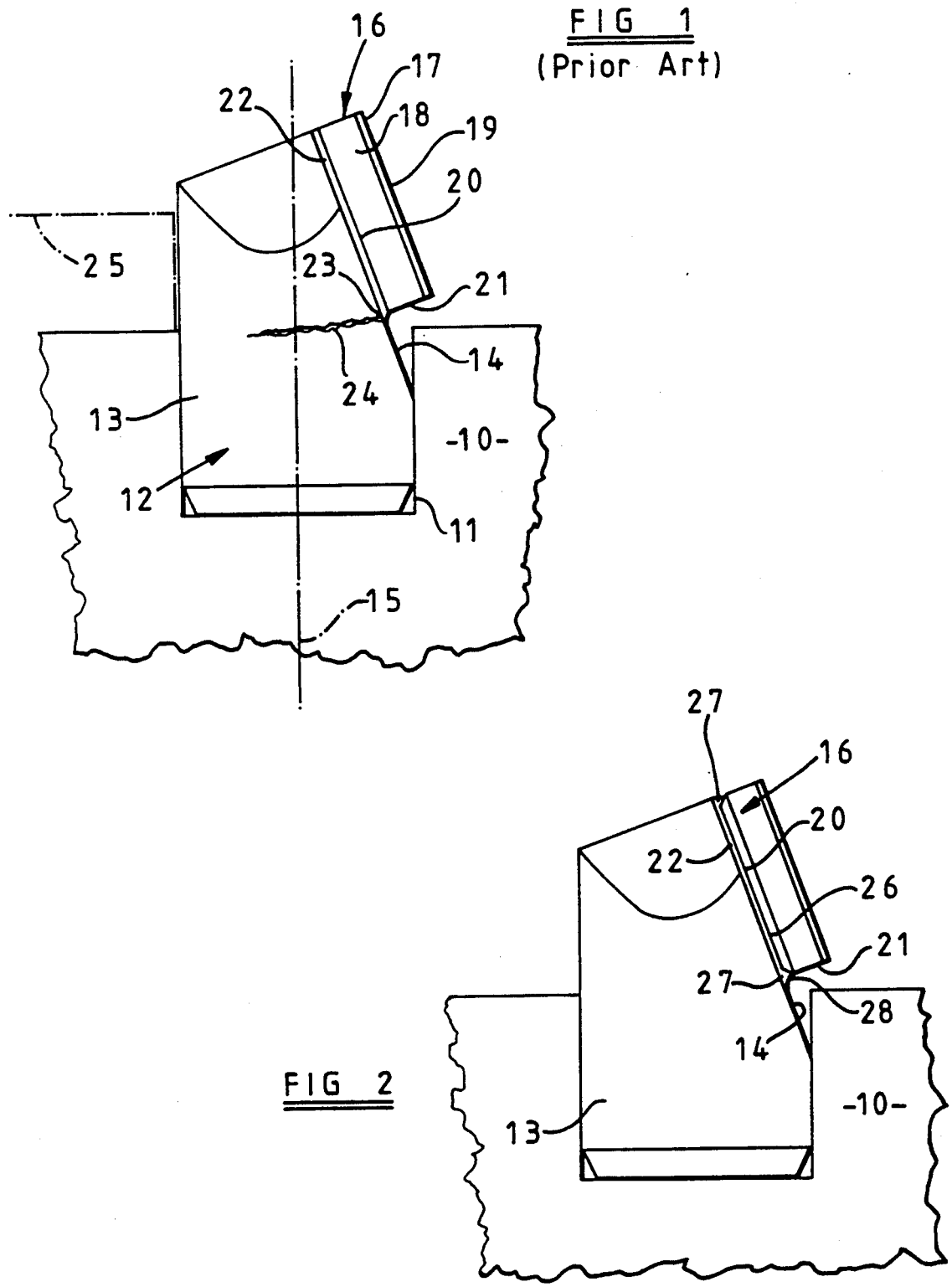

CUTTER ASSEMBLIES FOR ROTARY DRILL BITS, AND METHOD OF MANUFACTURING SAME

BACKGROUND OF THE INVENTION

The invention relates to cutter assemblies for rotary drill bits for use in drilling or coring holes in subsurface formations.

The cutter assemblies are for use in rotary drill bits of the "drag" kind comprising a bit body having a shank for connection to a drill string, a plurality of cutter assemblies mounted at the surface of the bit body, and a passage in the bit body for supplying drilling fluid to the surface of the bit for cleaning and/or cooling the cutters.

Each cutter assembly comprises a stud which is received in a socket in the surface of the bit body, the stud being formed, adjacent one end thereof, with a plane surface disposed at an angle of less than 90° to the longitudinal axis of the stud, and a preform cutting element being mounted on the inclined surface of the stud. The preform cutting element may be of the kind comprising a tablet, usually circular, having a thin hard cutting table of polycrystalline diamond bonded to a thicker, less hard substrate, for example of tungsten carbide. The two-layer arrangement of the cutting element provides a degree of self-sharpening since, in use, the less hard substrate wears away more easily than the harder cutting table. However single layer preform cutting elements of thermally stable polycrystalline diamond are also known.

The preform cutting elements are usually mounted on the stud by brazing a flat rear surface of the cutting element to the inclined surface of the stud. This arrangement normally provides a junction between the peripheral edge surface of the cutting element and the inclined plane surface of the stud which is, as seen in section, a sharp right-angled junction. It appears that this arrangement results in a stress concentration at the junction, particularly in the region furthest from the cutting edge of the cutting element, as a result of forces applied to the cutter assembly in use. This stress concentration is found to reduce the bending strength of the cutter assembly since it may initiate cracking of the stud in the area of the junction. Cutter assemblies of this kind are found to have a tendency to fail as a result of crack propagation through the stud from this area.

The present invention sets out to provide constructions of cutter assemblies, and methods of manufacture, which may increase the bending strength of the assembly and reduce this tendency of the stud to fail in this manner.

SUMMARY OF THE INVENTION

According to one aspect of the invention there is provided a cutter assembly, for a rotary drill bit, comprising a stud to be received in a socket in the surface of the bit body, the stud being formed, adjacent one end thereof, with a plane surface inclined at an angle of less than 90° to the longitudinal axis of the stud, and a preform cutting element comprising a front surface, a peripheral edge surface, and a flat rear surface which is bonded to said inclined plane surface on the stud, said peripheral edge surface of the cutting element being substantially wholly exposed, and the junction between the said peripheral edge surface and said rear surface of the cutting element being chamfered.

It may sometimes be considered that the terms "chamfer" and "chamfered" refer specifically to an arrangement where the linear junction between two surfaces is removed to provide an inclined bevel which is straight as seen in cross-section. While such an arrangement is certainly included within the scope of the present invention, the terms "chamfer" and "chamfered", where used in this specification, are intended to be of broader scope. Thus, the terms are intended to include any arrangement where the normal linear junction between the peripheral edge surface and the rear surface of the cutting element is replaced by any form of transition zone between the two surfaces, inwardly of where the junction would otherwise be. Such transition zone may be of any cross-sectional shape. The chamfer may be formed by removal of material from the corner between the surfaces of an otherwise conventional cutting element, or the element may be preformed with the chamfer during initial formation of the element in a high temperature, high pressure press.

It has been found, as will be described below, that the provision of a chamfer between said surfaces generally reduces the tendency for the cutter assembly to fail as a result of crack propagation from the junction between the periphery of the cutting element and the stud. U.S. Pat. No. 4,767,050 discloses a cutter in which a half round cutting element is brazed within a rebate in a stud, the straight edge of the half round cutting element being chamfered at its junction with the rear surface of the cutting element, at the corner of the rebate. However, the purpose of the chamfer is simply to accommodate the radius between the walls of the rebate to allow the straight and rear surfaces of the cutting element to be fitted closely to those walls. Furthermore, the chamfered straight edge surface of the cutting element is brazed to one wall of the rebate and is not exposed as required by the present invention. This is a most significant difference since it is known in the art that cutter assemblies of the kind disclosed in U.S. Pat. No. 4,767,050 are susceptible to failure due to crack propagation from the corner of the rebate in which the cutting element is brazed and, generally speaking, may be more likely to fail for this reason than conventional prior art assemblies where the cutting element is brazed on to a plane surface on the stud, rather than into a rebate.

As previously mentioned, the preform cutting element in a cutter assembly according to the present invention is preferably bonded to said inclined surface of the stud by brazing, although the invention may also provide advantage in cases where the cutting element is bonded to the surface of the stud by other methods, such as diffusion bonding.

In the case where the cutting element is bonded to the stud by brazing, preferably the space between said chamfer on the cutting element and said inclined surface of the stud is substantially wholly filled with braze metal. Preferably said braze metal is substantially confined to the space between the chamfer on the cutting element and the inclined surface of the stud, and between the rear surface of the cutting element and the surface of the stud, and does not extend beyond the peripheral edge surface of the cutting element.

The stud is preferably generally cylindrical and may be substantially circular in cross-section. The cutting element may be substantially circular and of substantially constant thickness. The cutting element may comprise a front cutting table of superhard material, such as polycrystalline diamond, bonded to a substrate of less hard material, such as cemented tungsten carbide, the substrate being bonded to said inclined plane surface of the stud. Alternatively, the cutting element may comprise thermally stable polycrystalline diamond.

The stud itself may be formed from tungsten carbide or other suitable material.

The invention also provides a method of manufacturing a cutter assembly for a rotary drill bit, which cutter assembly comprises a stud to be received in a socket in the surface of the bit body, the stud being formed, adjacent one end thereof, with a plane surface inclined at an angle of less than 90° to the longitudinal axis of the stud, and a preform cutting element comprising a front surface, a peripheral edge surface, and a flat rear surface which is bonded to said inclined plane surface on the stud, the method comprising forming the cutting element, before it is brazed to the stud, with a peripheral chamfer at the junction between the peripheral edge surface and the rear surface of the cutting element, and brazing the rear surface of the cutting element to said inclined surface of the stud with the peripheral edge surface of the cutting element substantially wholly exposed. Some braze metal may be allowed to enter, and perhaps substantially fill, the space between said chamfer and the inclined surface of the stud.

The method may include the further step of removing at least some of the braze metal, after it has solidified, from the space between the chamfer and the inclined surface of the stud.

The braze metal may be prevented, during the brazing process, from extending beyond the peripheral edge of the cutting element.

The invention further provides, in a second aspect, a method of manufacturing a cutter assembly for a rotary drill bit, which cutter assembly comprises a stud to be received in a socket in the surface of the bit body, the stud being formed, adjacent one end thereof, with a plane surface inclined at an angle of less than 90° to the longitudinal axis of the stud, and a preform cutting element comprising a front surface, a peripheral edge surface, and a flat rear surface which is bonded to said inclined plane surface on the stud, the method comprising brazing the rear surface of the cutting element to said inclined surface of the stud, and allowing some brazed metal to flow and solidify as a fillet extending beyond the peripheral edge surface of the cutting element, and then removing substantially all of said fillet of braze metal.

It has been found that removing the fillet of braze metal may reduce the tendency of the cutter assembly to fail as a result of crack propagation from the junction between the cutter element and the stud, and this advantage may be achieved with or without the provision of a peripheral chamfer on the cutting element according to the first aspect of the invention.

Preferably, however, the two aspects of the invention are combined and thus the method according to the second aspect of the invention may include the further step of forming the cutting element, before it is brazed to the stud, with a peripheral chamfer at the junction between the peripheral edge surface and the rear surface of the cutting element, and allowing some braze metal to fill the space between said chamfer and the inclined surface of the stud and to flow and solidify as a fillet extending beyond the peripheral edge surface of the cutting element, and then removing substantially all of said fillet of braze metal.

The method may include the further step of also removing at least some of the braze metal, after it has solidified, from the space between the chamfer and the inclined surface of the stud.

Instead of removing the fillet of solidified braze metal after the brazing process has been completed, a similar advantageous effect may be achieved, in the case where the cutting element is chamfered, by ensuring that braze metal does not flow beyond the peripheral surface of the cutting element.

BRIEF DESCRIPTION OF THE DRAWINGS

FIG. 1 is a section through a portion of a bit body showing diagrammatically a typical prior art cutter assembly.

FIG. 2 is a similar view showing a cutter assembly according to the present invention.

DETAILED DESCRIPTION OF THE PREFERRED EMBODIMENTS

Figure 3:
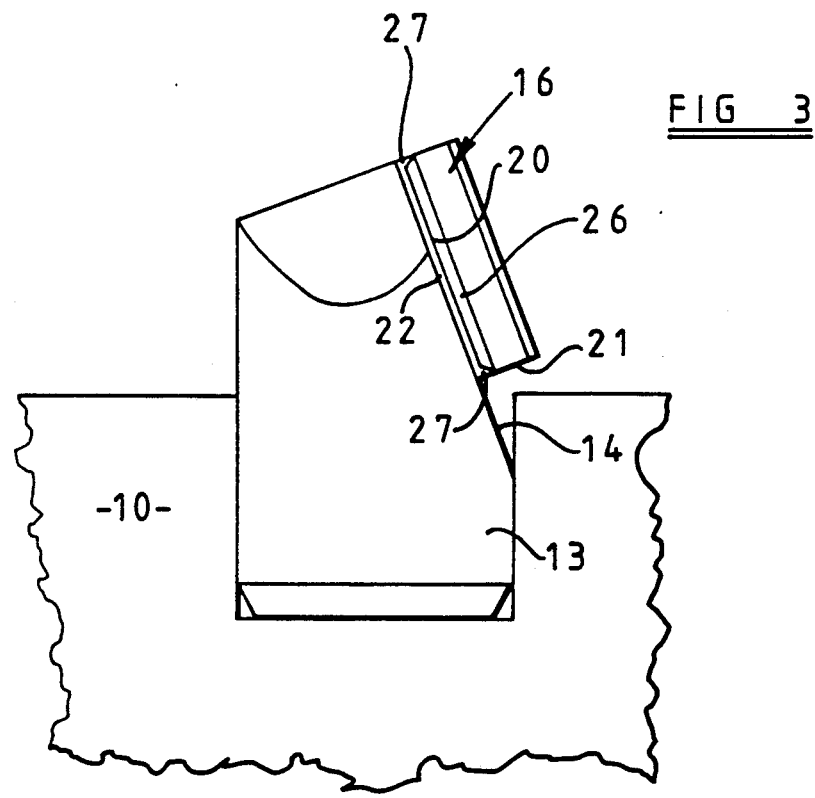
FIG. 3 is a similar view showing an alternative assembly according to the invention.

Referring to FIG. 1, the bit body is indicated at 10 and, as is well known, may be formed from steel or infiltrated matrix material. The general construction of such drill bits is well known and will not therefore be described in detail. The bit body is formed over the surface thereof with a plurality of cylindrical sockets 11 of circular cross section and received in each socket is a cutter assembly 12. The cutter assembly is usually shrink-fitted or brazed into the socket 11.

The cutter assembly comprises a generally cylindrical stud 13, formed for example from cemented tungsten carbide, which is formed adjacent one end thereof with an inclined plane surface 14 which is disposed at an angle of less than 90°, for example 55°, to the longitudinal axis 15 of the stud 13.

Mounted on the inclined surface 14 is a preform cutting element 16 comprising a cutting table 17 of polycrystalline diamond bonded to a thicker substrate 18 of cemented tungsten carbide. The cutting element 16 is in the form of a circular disc and comprises a front cutting face 19 provided by the polycrystalline diamond table, a rear face 20 and a peripheral edge surface 21.

The rear surface 20 of the cutting element is flat and is brazed to the inclined plane surface 14 of the stud 13, the layer of braze metal being indicated at 22. (In all of the accompanying drawings the thickness of the layer of braze metal is somewhat exaggerated for clarity.) The cutting element may be brazed to the stud by the process known as "LS bonding" in which a heat sink is applied to the polycrystalline diamond table of the cutting element to prevent thermal degradation of that table during the bonding process.

Due to the structure of the cutter assembly, there tends to be a stress concentration at the junction between the peripheral edge surface 21 of the cutting element and the surface 14, particularly in the region, indicated at 23, remote from the cutting edge of the cutting element.

In practice the stress concentration in this area reduces the bending strength of the assembly by leading to crack propagation across the thickness of the stud 13, as indicated at 24, due to the forces applied to the cutting element during operation of the drill bit. This can lead to premature failure of the cutter assembly. In order to reduce this effect the configuration of the bit body 10 may be made such as to provide back support for the cutter assembly, as indicated in chain lines at 25, but such failures can still occur.

FIG. 2 illustrates a modified cutter assembly according to the present invention. Elements corresponding to those of the prior att cutter assembly of FIG. 1 are given the same reference numerals.

In accordance with the invention, the cutting element 16 is formed with a peripheral chamfer 26 at the junction between the peripheral edge surface 21 of the cutting element and its flat rear surface 20. When the cutting element is brazed to the surface 14 of the stud 13 the braze metal 22 flows into the space between the chamfer 26 and the surface 14, as indicated at 27.

It is found, as will be shown by the test results given below, that this construction reduces the tendency for the stud to fracture in operation due to crack propagation as described above in relation to the prior art.

In the arrangement shown in FIG. 2, a fillet 28 of braze material is left at the junction between the peripheral surface 21 of the cutting element and the plane surface 14 of the stud. However, again as will be shown by the test results given below, the improvement given by the invention can be enhanced by removing the fillet 28 to give the configuration shown in FIG. 3. Any suitable technique may be used for removal of the brazing alloy fillet, including filing, bead blasting and grit blasting. Blasting using silicon carbide grit is rapid and produces consistent results but it can affect the dimensional accuracy of the post 13.

In the arrangements shown the chamfer 26 is an inclined bevel which is straight as seen in cross section so as to provide a frusto-conical surface on the cutting element. However, the invention includes within its scope chamfers which are of other shapes in cross section. For example, FIG. 4 shows, on an enlarged scale, a chamfer which is rounded as seen in cross section.

Figure 4:
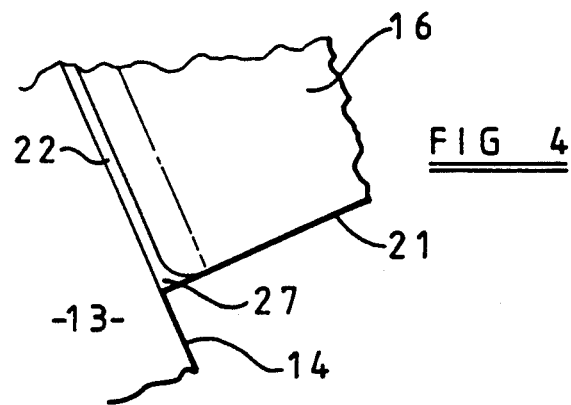
FIG. 4 is an enlarged view of part of a cutter assembly, showing a different form of chamfer.

Although the advantageous arrangement shown in FIGS. 3 and 4 may be obtained, as described, by subsequent removal of the fillet 28 after the cutting element has been brazed to the stud, it will be appreciated that a similar configuration might be obtained by controlling the brazing alloy so that it fills the space between the chamfer 26 and the surface 14 but does not flow significantly beyond that space to form a fillet.

Figure 5:
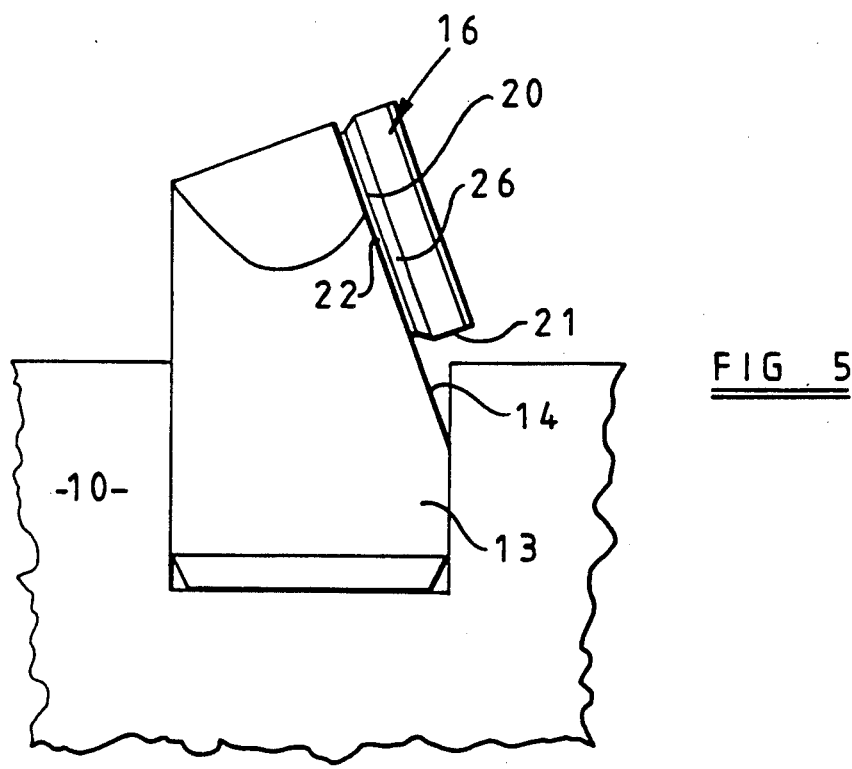
FIGS. 5 and 6 are similar views to FIG. 2, showing further cutter assemblies according to the invention.

In addition to removing the fillet 28 of brazed material which extends beyond the peripheral surface 21 of the cutting element, there may also be advantage in removing the braze material from the space between the chamfer 26 on the cutting element and the inclined surface 14 on the stud. FIG. 5 shows such an arrangement where the braze material has been removed from this space. Again, any suitable technique may be used for the removal of the braze material, such as the techniques referred to above for removing the fillet.

Again also, the configuration of FIG. 5 may be achieved by controlling the quantity and flow of the brazing alloy so that it does not flow into the space between the chamfer 26 and inclined surface 14 on the stud, during the brazing process.

Figure 6:
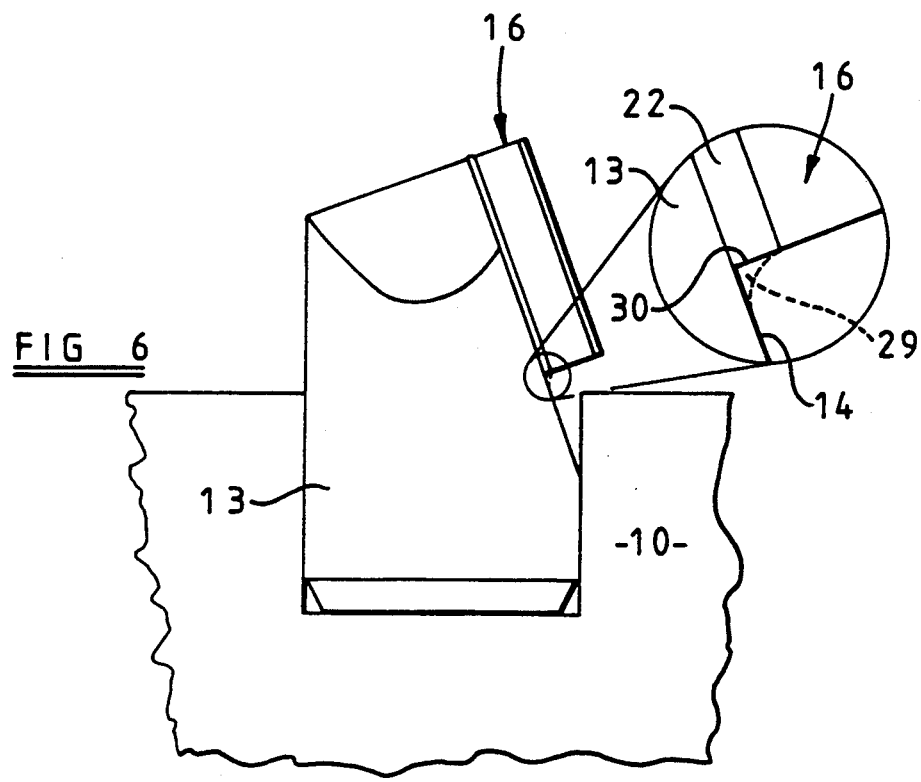

As previously mentioned, the invention also includes within its scope a method of manufacturing a cutter assembly which comprises removing the fillet of braze alloy in constructions where the cutting element is not chamfered, such as in the prior art cutter assembly of FIG 1. Such an arrangement is shown in FIG. 6.

In the conventional prior art method the cutting element 16 is bonded to the surface 14 of the stud 13 by a layer of brazing alloy 22. In practice, this process will leave a fillet of brazing alloy around the junction, as indicated in dotted line at 29 in FIG. 6, although for simplicity this fillet is not normally shown in diagrammatic representations of cutter assemblies appearing in patent specifications and similar technical documents. According to this aspect of the present invention this fillet 29 is removed, by any of the methods referred to above, to the position indicated at 30 in FIG. 6. It is found that this increases the bending strength of the prior art cutter assembly.

Table 1 sets out the results of tests carried out on cutter assemblies. In each test the cutter assembly comprised a tungsten carbide stud (or post) to which was brazed, by LS bonding, a cutting element, the brazing alloy being one of three known brazing alloys: Cocuman and two other commercially available brazing alloys identified in Table 1 as A and B respectively.

The tungsten carbide post was shrink fitted into a socket in a rigidly supported steel plug, simulating the bit body, and an increasing load was applied to the front face 19 of the cutting element, at right angles thereto. Table 1 shows the load at which the cutting element failed by fracture of the stud, except in the case, identified as "Unbonded post" where no cutting element was bonded to the stud or post and the load was applied to the surface 14 of the stud itself. In this case failure had not occurred at the load indicated. In Table 1:

"Bonded-inferior bond fillet" indicates the conventional prior art arrangement where the cutting element is unchamfered and where a fillet, as shown at 29 in FIG. 6, is maintained at the junction between the peripheral surface of the cutting element and the inclined surface of the stud. In this case "inferior bond fillet" indicates that the fillet had not properly flowed and wetted the surface 14 of the stud and was uneven and/or pitted.

"Bonded-good bond fillet" indicates the arrangement shown in FIG. 6 with an unchamfered cutting element and a good fillet 29 present.

"Bonded-fillet removed" indicates the arrangement according to the invention illustrated in FIG. 6 where the fillet 29 has been removed by grit blasting or other appropriate process.

"Bonded-chamfered PDC" indicates the arrangement according to the invention shown in FIG. 2 where the rear surface of the cutting element is chamfered and where the fillet 28 of brazing alloy is maintained.

"Bonded-chamfered PDC with fillet removed" indicates the preferred arrangement according to the invention shown in FIG. 3 where the rear surface of the cutting element is chamfered but where the fillet 28 has been subsequently removed, for example by grit blasting.

It will be seen from Table 1 that the bonding of a cutting element to the post significantly reduces the bending strength of the stud, and the extent to which the bending strength is reduced varies considerably according to the type of brazing alloy used. In all cases except one, however, the construction and methods according to the present invention improved the bending strength of the cutter assembly regardless of the type of brazing alloy used.

The results indicated in Table 1 are for the case where the stud of the cutter assembly is shrink fitted into its socket. However, the present invention is also applicable to cutter assemblies which are brazed into their sockets.

In Table 1 the criterion value of 120 KN was established as the bend strength of a standard Cocuman bonded cutter assembly. Table 1 therefore also relates all other measured strengths as percentages of this criterion value.

TABLE 1

| CONDITION | COCUMAN | ALLOY A | ALLOY B |
|---|---|---|---|
| Unbonded post | 160 KN+ Unfailed | 160 KN+ Unfailed | 160 KN+ Unfailed |
| Bonded-Inferior Bond Fillet | 120 KN (100%) | 65 KN (54%) | 54 KN (45%) |
| Bonded-Good Bond Fillet | 120 KN (100%) | 95 KN (79%) | 72 KN (60%) |
| Bonded-Fillet Removed | 120 KN (100%) | 110 KN (92%) | 80 KN (67%) |
| Bonded-Chamfered PDC | 140 KN (117%) | 125 KN (104%) | 118 KN (98%) |
| Bonded-Chamfered PDC with Fillet removed | 150 KN (125%) | 135 KN (113%) | 135 KN (113%) |

I claim:

1. A cutter assembly, for a rotary drill bit, comprising a stud to be received in a socket in the surface of the bit body, the stud being formed, adjacent one end thereof, with a plane surface inclined at an angle of less than 90° to the longitudinal axis of the stud, and a preform cutting element comprising a front surface, a peripheral edge surface, and a flat rear surface which is bonded to said inclined plane surface on the stud, said peripheral edge surface of the cutting element being substantially wholly exposed, and the junction between said peripheral edge surface and said rear surface of the cutting element being chamfered, at least in a region thereof which is furthest from said one end of the stud.

2. A cutter assembly according to claim 1, wherein the chamfering of the cutting element is in the form of a sloping bevel which is substantially straight as seen in cross-section.

3. A cutter assembly according to claim 1, wherein the chamfering of the cutting element is rounded as seen in cross-section.

4. A cutter assembly according to claim 1, wherein the preform cutting element is bonded to said inclined surface of the stud by brazing.

5. A cutter assembly according to claim 4, wherein there is a space between said chamfer on the cutting element and said inclined surface of the stud, and wherein said space is substantially wholly filled with braze metal.

6. A cutter assembly according to claim 5, wherein said braze metal is substantially confined to the space between the chamfer on the cutting element and the inclined surface of the stud, and between the rear surface of the cutting element and the surface of the stud, and does not extend beyond the peripheral edge surface of the cutting element.

7. A cutter assembly according to claim 1, wherein the stud is generally cylindrical and substantially circular in cross-section.

8. A cutter assembly according to claim 1, wherein the cutting element is substantially circular and of substantially constant thickness.

9. A cutter assembly according to claim 1, wherein the cutting element comprises front cutting table of superhard material bonded to a substrate of less hard material, the substrate being bonded to said inclined plane surface of the stud.

10. A cutter assembly according to claim 1, wherein the cutting element comprises thermally stable polycrystalline diamond.

11. A method of manufacturing a cutter assembly for a rotary drill bit, which cutter assembly comprises a stud to be received in a socket in the surface of the bit body, the stud being formed, adjacent one end thereof, with a plane surface inclined at an angle of less than 90° to the longitudinal axis of the stud, and a preform cutting element comprising a front surface, a peripheral edge surface, and a flat rear surface which is bonded to said inclined plane surface on the stud, the method comprising forming the cutting element, before it is brazed to the stud, with a peripheral chamfer along at least a portion of the junction between the peripheral edge surface and the rear surface of the cutting element, and brazing the rear surface of the cutting element to said inclined surface of the stud with the peripheral edge surface of the cutting element substantially wholly exposed, and said chamfered portion of the cutting element being located at least in a region thereof which is furthest from said one end of the stud.

12. A method according to claim 11, wherein some braze method is allowed to enter the space between said chamfer and the inclined surface of the stud.

13. A method according to claim 12 wherein some braze metal is allowed substantially to fill the space between said chamfer and the inclined surface of the stud.

14. A method according to claim 12, including the further step of removing at least some of the braze metal, after it has solidified, from the space between the chamfer and the inclined surface of the stud.

15. A method according to claim 12, wherein the braze metal is prevented from extending beyond the peripheral edge surface of the cutting element.

* * * * *